United States Patent
Jacoby et al.

(10) Patent No.: US 12,305,263 B2
(45) Date of Patent: May 20, 2025

(54) CLAD 2XXX-SERIES AEROSPACE PRODUCT

(71) Applicant: Aleris Rolled Products Germany GmbH, Koblenz (DE)

(72) Inventors: Bernd Jacoby, Limburg (DE); Achim Bürger, Höhr-Grenzhausen (DE); Sabine Maria Spangel, Koblenz (DE); Philippe Meyer, Agnetz (FR)

(73) Assignee: Novelis Koblenz GmbH, Koblenz (DE)

( * ) Notice: Subject to any disclaimer, the term of this patent is extended or adjusted under 35 U.S.C. 154(b) by 557 days.

(21) Appl. No.: 17/753,337

(22) PCT Filed: Aug. 13, 2020

(86) PCT No.: PCT/IB2020/057627
§ 371 (c)(1),
(2) Date: Feb. 28, 2022

(87) PCT Pub. No.: WO2021/044239
PCT Pub. Date: Mar. 11, 2021

(65) Prior Publication Data
US 2022/0316033 A1 Oct. 6, 2022

(30) Foreign Application Priority Data
Sep. 5, 2019 (EP) .................................. 19195491

(51) Int. Cl.
C22C 21/06 (2006.01)
B32B 15/01 (2006.01)
C22C 21/16 (2006.01)
C22F 1/047 (2006.01)

(52) U.S. Cl.
CPC ............ *C22C 21/06* (2013.01); *B32B 15/016* (2013.01); *C22C 21/16* (2013.01); *C22F 1/047* (2013.01)

(58) Field of Classification Search
CPC ......... C22C 21/06; C22C 21/16; C22F 1/047; B32B 15/016
See application file for complete search history.

(56) References Cited

U.S. PATENT DOCUMENTS

| 3,418,090 A | 12/1968 | Fritzlen |
| 2002/0031682 A1 | 3/2002 | Dif et al. |
| 2014/0366999 A1 | 12/2014 | Kamat et al. |

FOREIGN PATENT DOCUMENTS

| CN | 106079739 A | 11/2016 |
| EP | 1557260 | 7/2005 |
| EP | 2121997 | 11/2009 |
| EP | 2635720 | 7/2017 |
| JP | 55113857 A | 9/1980 |
| JP | 0754088 A | 2/1995 |
| JP | 2009535508 A | 10/2009 |
| JP | 2016183364 A | 10/2016 |
| RU | 2533989 C2 | 11/2014 |
| WO | 2017183965 | 10/2017 |
| WO | 2018200355 A1 | 11/2018 |

OTHER PUBLICATIONS

English Abstract and English Machine Translation of De Smet et al. (EP 1852251 A1) (Nov. 7, 2007).*
Zakharov, V. V. "Effect of scandium on the structure and properties of aluminum alloys." Metal science and heat treatment 45.7 (2003): 246-253.*
Canadian Application No. 3, 146,252 , "Office Action", Nov. 23, 2022, 3 pages.
European Application No. 19195491.6, Intention to Grant mailed on Mar. 25, 2022, 5 pages.
Hatch , "Aluminium, Characteristics and Physical Metal Science", Metallurgy, 1989, p. 353.
Russian Application No. 2022103082 , "Office Action", Oct. 26, 2022, 10 pages.
Russian Application No. 2022103082 , "Notice of Decision to Grant", Jan. 23, 2023, 14 pages.
"Aluminum Handbook", General Incorporated Association, Japan Aluminium Association, Standard Committee, 7th Edition, Jan. 31, 2007, pp. 5-14.
European Application No. 20756980.7 , "Intention to Grant", Dec. 23, 2022, 5 pages.
Japanese Application No. 2022-514844 , "Office Action", Apr. 18, 2023, 8 pages.
Canadian Application No. 3,146,252, "Notice of Allowance", Nov. 20, 2023, 3 pages.
Korean Application No. 10-2022-7010752, "Office Action", Jan. 10, 2024, 10 pages.
"International Alloy Designations and Chemical Composition Limits for Wrought Aluminum and Wrought Aluminum Alloys", The Aluminum Association, XP003023672, Apr. 1, 2004, pp. 1-35.
European Application No. 19195491.6 , Extended European Search Report, Mailed On Mar. 20, 2020, 6 pages.
International Application No. PCT/IB2020/057627 , International Search Report and Written Opinion, Mailed On Nov. 9, 2020, 12 pages.
Indian Application No. 202217009534 , "First Examination Report", Apr. 29, 2022, 6 pages.
Japanese Application No. 2022-514844 , "Notice of Decision to Grant", Sep. 14, 2023, 6 pages.
"Aluminum standards and data 2003 Metric SI", The Aluminum Association, Inc., Mar. 2003, pp. 1-10.

(Continued)

*Primary Examiner* — Jessee R Roe
(74) *Attorney, Agent, or Firm* — Kilpatrick Townsend & Stockton LLP

(57) ABSTRACT

The invention relates to a rolled composite aerospace product comprising a 2XXX-series core layer and an Al—Mg alloy clad layer coupled to at least one surface of the 2XXX-series core layer, wherein the Al—Mg alloy is a 5XXX-series aluminium alloy comprising 0.4% to 4.8% Mg, and preferably 0.7% to 4.5% Mg.

14 Claims, 2 Drawing Sheets

(56) References Cited

OTHER PUBLICATIONS

"International Alloy Designations and Chemical Composition Limits for Wrought Aluminum and Wrought Aluminum Alloys", The Aluminum Association Inc., Feb. 2009, 37 pages.
"International Alloy Designations and Chemical Composition Limits for Wrought Aluminum and Wrought Aluminum Alloys", The Aluminum Association, Inc., Jan. 2015, 38 pages.
EP20756980.7 , "Notice of Opposition", Jan. 19, 2024, 1 page.
EP20756980.7 , "Notice of Opposition", Jan. 11, 2024, 17 pages.
EP20756980.7 , "Notice of Opposition", Jan. 19, 2024, 2 pages.
Hatch , "Aluminum: Properties and Physical Metallurgy", American Society for Metals, 1984, pp. 372-374.
Schwensfeir Jr. et al., "Comparison of Bond in Roll-bonded and Adhesively Bonded Aluminums", published by NASA. Langley Research Center Welding, Bonding and Fastening, Sep. 1, 1985, pp. 323-328.
Brazilian Application No. BR112022001298-5, "Office Action", Jan. 21, 2025, 5 pages.
European Application No. 20756980.7, "Summons to Attend Oral Proceedings", Feb. 24, 2025, 18 pages.

\* cited by examiner

CLAD 2XXX-SERIES AEROSPACE PRODUCT

CROSS-REFERENCE TO RELATED APPLICATION

This application claims the benefit of and priority to European Patent Application No. 19195491.6 filed Sep. 5, 2019 and titled "CLAD 2XXX-SERIES AEROSPACE PRODUCT," the content of which is herein incorporated by reference in its entirety.

FIELD OF THE INVENTION

The invention relates to a rolled composite aerospace product comprising a 2XXX-series core layer and an aluminium alloy layer coupled to at least one surface of the 2XXX-series core layer. The rolled composite aerospace product is ideally suitable for structural aerospace parts. The invention further relates to a method of manufacturing a rolled composite aerospace product.

BACKGROUND OF THE INVENTION

In the aerospace industry the AA2024-series aluminium alloy and modifications thereof are widely used as a high damage tolerant aluminium alloy, mostly in a T3 condition or modifications thereof. Products of these aluminium alloys have a relatively high strength to weight ratio and exhibit good fracture toughness, good fatigue properties, and adequate corrosion resistance.

Already for many decades to enhance the corrosion resistance the AA2024-series alloy product may be provided as a composite product with on one or both sides a relative thin cladding layer. The cladding layer is usually of higher purity which corrosion protects the AA2024 core alloy. The cladding includes essentially unalloyed aluminium. Often reference is made to 1XXX-series aluminium alloys in general, and which include the sub-classes of the 1000-type, 1100-type, 1200-type and 1300-type. In practice, however, the 1XXX-series aluminium alloy used for the cladding layer is rather very pure and has a composition of, Si+Fe<0.7%, Cu<0.10%, Mn<0.05%, Mg<0.05%, Zn<0.10%, Ti<0.03%, and balance aluminium.

The AA2024-series aluminium alloy clad with a 1XXX-series alloy may also be anodized. Anodizing increases resistance to corrosion and wear and provides better adhesion for paint primers and adhesives than does bare metal. Anodized articles are applied in structural adhesive metal bonding such as in skin panels of a wing, horizontal tail plane, vertical tail plane or a fuselage. A further known application comprises a sandwich structure, wherein one or more (glass) fibre reinforced layers are interposed between aluminium panels or sheets using adhesive bonding resulting in a so-called fibre metal laminate. Patent document WO-2017/183965-A1 (Fokker) discloses a method of anodizing an aluminium alloy for applying a porous anodic oxide coating in preparation of the subsequent application of an adhesive bonding layer and/or a primer layer.

A disadvantage of the 1XXX-series alloy as clad layer is that these alloys are very soft and sensitive to surface damage during handling of the product. And also during a forming operation this may lead to for example die-sticking.

DESCRIPTION OF THE INVENTION

As will be appreciated herein below, except as otherwise indicated, aluminium alloy and temper designations refer to the Aluminium Association designations in Aluminum Standards and Data and the Registration Records, as published by the Aluminium Association in 2018, and frequently updated, and are well known to the persons skilled in the art. The temper designations are laid down also in European standard EN515.

For any description of alloy compositions or preferred alloy compositions, all references to percentages are by weight percent unless otherwise indicated.

The term "up to" and "up to about", as employed herein, explicitly includes, but is not limited to, the possibility of zero weight-percent of the particular alloying component to which it refers. For example, up to 0.25% Zn may include an aluminium alloy having no Zn.

For the purpose of this invention a sheet product or a sheet material is to be understood as a rolled product having a thickness of not less than 1.3 mm (0.05 inches) and not more than 6.3 mm (0.25 inches), and plate material or a plate product is to be understood as a rolled product having a thickness of more than 6.3 mm (0.25 inches). See also Aluminium Standard and Data, the Aluminium Association, Chapter 5 Terminology, 1997.

It is an object of the invention to provide a rolled aerospace product comprising based on a 2XXX-series alloy and offering an improved balance of corrosion resistance and formability.

This and other objects and further advantages are met or exceeded by the present invention providing a rolled composite aerospace product comprising a 2XXX-series core layer, wherein the core layer has two faces, and an Al—Mg alloy clad layer coupled to at least one surface of the 2XXX-series core layer, wherein the Al—Mg alloy is a 5XXX-series aluminium alloy comprising 0.4% to 4.8% Mg and preferably 0.7% to 4.5% Mg.

Al—Mg alloys or 5XXX-series alloys have very good formability characteristics such that the rolled composite aerospace product can be formed in forming operations requiring a high degree of deformation. The formability characteristics are at least comparable to those of several automotive sheet aluminium alloys. The die-sticking of the clad layer to a forming die is significantly reduced or even avoided due to the increased hardness of the cladding layer compared to a 1XXX-series clad layer. The Al—Mg alloys or 5XXX-series alloys have a good hemming performance when for example formed into a flat hem. There are no visible surface cracks after forming a flat hem. The absence of surface cracks avoids the pick-up into the surface of any forming lubricants. The absence of surface cracks also significantly increases the fatigue performance of the composite aerospace product. Also, the very good resistance against pitting corrosion improves the fatigue performance as fatigue is common triggered by pitting initiation sites. The use of Al—Mg alloys or 5XXX-series alloys avoid also the formation of Lüders-lines or stretcher strain marks during a stretching operation leading to a very good surface quality. The Al—Mg or 5XXX-series alloys have a harder surface than 1XXX-series alloys resulting in corresponding less surface damages like scratches during product handling. The Al—Mg or 5XXX-series alloys allow also an improved grain size control of the cladding as there is significantly reduced grain size growth during a high temperature processing step compared to 1XXX-series aluminium alloys and thereby improving the surface quality after a forming operation.

Al—Mg alloys or 5XXX-series alloys are very good anodizable such that there are no issues with the subsequent application of an adhesive bonding layer and/or a primer layer.

Also the recycling of industrial sized scrap of the rolled composite aerospace product does not lead to any major issues as the 2XXX-series alloy has purposive additions also of Mn and Mg. Roll bonded products can be remolten without prior separation of the cladding layer(s) from the core layer.

In an embodiment the 5XXX-series aluminium alloy clad layer achieves a hardness of at least 48 HB when brought to an O-temper. In an embodiment the 5XXX-series aluminium alloy clad layer achieves a hardness of at least 50 HB, and preferably of at least 55 HB, when brought to an O-temper.

In an embodiment the Al—Mg alloy or 5XXX-series aluminium alloy clad layer is bonded to the core layer by means of roll bonding, and preferably by means of hot rolling, to achieve the required metallurgical bonding between the layers. Such a roll bonding process is very economical and results in a very effective composite product presenting the desired properties. When carrying out such a roll-bonding process for producing the rolled composite product according to the invention, it is preferred that both the core layer and the Al—Mg clad layer(s) experience a thickness reduction during the roll bonding. Typically, prior to rolling, in particular prior to hot rolling, the rolling faces of ingots of both the core layer and the clad layer(s) are scalped in order to remove segregation zones near the as-cast surface of the rolling ingot and to increase product flatness.

Preferably a cast ingot or slab of the 2XXX alloy core layer is homogenized prior to hot rolling and/or it may be preheated followed directly by hot rolling. The homogenisation and/or preheating of 2XXX-series alloys prior to hot rolling is usually carried out at a temperature in the range 400° C. to 505° C. in single or in multiple steps. In either case, the segregation of alloying elements in the material as-cast is reduced and soluble elements are dissolved. If the treatment is carried out below about 400° C., the resultant homogenisation effect is inadequate. If the temperature is above about 505° C., eutectic melting might occur resulting in undesirable pore formation. The preferred time of this heat treatment is between 2 and 30 hours. Longer times are not normally detrimental. Homogenisation is usually performed at a temperature above about 480° C. A typical preheat temperature is in the range of about 430° C. to 460° C. with a soaking time in a range of up to about 15 hours.

The Al—Mg aluminium alloy or 5XXX-series aluminium alloy can be provided as an ingot or slab for fabrication into rolling feedstock using semi-continuous casting techniques regular in the art for cast products, e.g. DC-casting, EMC-casting, EMS-casting, and preferably having an ingot thickness in a range of about 300 mm or more, e.g. 500 mm or 600 mm. In another embodiment thinner gauge slabs resulting from continuous casting, e.g. belt casters or roll casters, also may be used to provide the Al—Mg aluminium alloy or 5XXX-series aluminium alloy clad liner feedstock, and having a thickness of up to about 40 mm.

In an embodiment of the invention the cast ingot or slab forming the Al—Mg alloy or 5XXX-series aluminium alloy clad liner is preferably preheated or homogenized at a temperature of at least 470° C., and preferably at least 480° C., prior to hot rolling in single or multiple rolling steps to thinner gauge forming a rolled clad liner. To avoid eutectic melting resulting in possible undesirable pore formation within the ingot the temperature should not be too high and should typically not exceed 570° C., and preferably not exceeding 555° C. The time at temperature for a large commercial size ingot should be at least 0.5 hours and can be about 1 to 36 hours. A longer period, for example 48 hours or more, has no immediate adverse effect on the desired properties, but is economically unattractive. The homogenisation or preheat results in a finer and more homogeneous grain structure and results in an increased formability of the Al—Mg alloy layer in the final rolled composite aerospace product.

The rolled composite aerospace product is down-gauged to final gauge by means of hot rolling and optionally followed by cold rolling as is regular in the art. After the rolled composite product is rolled to final gauge the rolled composite product is solution heat treated at a temperature in the range of about 450° C. to 505° C. for a time sufficient for solution effects to approach equilibrium, with typical soaking times in the range of 5 to 120 minutes. Preferably the solution heat-treatment is at a temperature in the range of 475° C. to 500° C., for example at about 495° C. The solution heat-treatment is typically carried out in a batch furnace or in a continuous furnace. Preferred soaking times at the indicated temperature is in the range of about 5 to 35 minutes. However, with clad products, care should be taken against too long soaking times since in particular too much copper from the 2XXX core layer may diffuse into the aluminium alloy clad layer(s) which can detrimentally affect the corrosion protection afforded by said layer(s). A continuous SHT operation reduces the formation of so-called stretcher strain markings in comparison to batch annealing. A continuous SHT requires a rapid heat-up of the moving roll bonded product, wherein the average heat-up rate is more than 5° C./sec, and preferably more than 10° C./sec.

After solution heat treatment, it is important that the composite product is cooled sufficiently fast to a temperature of 175° C. or lower, preferably to 100° C. or lower, and more preferably to ambient temperature, to prevent or minimize the uncontrolled precipitation of secondary phases, e.g. $Al_2CuMg$ and $Al_2Cu$. On the other hand, cooling rates should not be too high to allow for a sufficient flatness and low level of residual stresses in the composite product. Suitable cooling rates can be achieved with the use of water, e.g. water immersion or water jets. The solution heat-treatment in this temperature range results in a fully recrystallized microstructure for the Al—Mg alloy or 5XXX-series aluminium alloy layer(s) having a Mg content of up to 2.5%. In this condition, i.e. O-temper, the clad layer(s) offer(s) an enhanced formability compared to a non-recrystallized condition. In a subsequent forming operation, e.g. by means of stretching or stretch forming, the clad layer will obtain a favourable increased hardness and strength.

The composite product may be further cold worked, for example, by stretching up in the range of 0.5% to 8% of its original length in order relieve residual stresses therein and to improve the flatness of the product. Preferably the stretching up is in the range of 0.5% to 6%, more preferably of 0.5% to 4% and most preferably of 0.5% to 3%.

After cooling the rolled composite aerospace product is naturally aged, typically at ambient temperatures, and alternatively the composite aerospace product can also be artificially aged. Artificial ageing during this process step can be of particular use for higher gauge products.

The 5XXX-series aluminium alloy layer or layers are usually much thinner than the core, each Al—Mg alloy layer constituting 1% to 20% of the total composite thickness. An Al—Mg alloy layer more preferably constitutes around 1% to 10% of the total composite thickness.

In an embodiment the 5XXX-series aluminium alloy layer is bonded on one surface or face of the 2XXX-series core layer.

In an embodiment the 5XXX-series aluminium alloy layer is bonded on both surfaces or faces of the 2XXX-series core layer forming an outer surface of the rolled composite aerospace product.

In an embodiment an interliner or interlayer is positioned between the 2XXX-series core layer and the 5XXX-series aluminium alloy layer, and wherein the interliner is made from a different aluminium alloy than the 5XXX-series aluminium layer and has a Mg-content lower than the 5XXX-series aluminium alloy. Such an aluminium alloy for the interliner can be a 1XXX-series alloy or a 5XXX-series alloy having lower Mg levels or a 3XXX-series aluminium alloy. This interliner acts as a further diffusion barrier of Cu from the core alloy to the outer surface layer formed by the 5XXX-series aluminium alloy. It allows for the creating of a difference in Zn and/or Mn content between the various layers and creating a Mn-gradient and/or a Zn-gradient and thereby providing increased galvanic protection to the 2XXX-series core alloy and enhancing the pitting and intergranular corrosion resistance of the 2XXX-series core alloy by preferential interliner corrosion, while the hardness and surface characteristics provided by the 5XXX-series aluminium alloy outer-layer are maintained. As the interliner has a purposive lower Mg-content than the 5XXX-series outer-layer the metallurgical bonding resulting from the roll bonding operation of the various layers to the core alloy is improved. The interliner is preferably also roll bonded to the core alloy. Each interliner constitutes 1% to 20% of the total composite aerospace product thickness, and preferably constitutes around 1% to 10% of the total composite aerospace product thickness.

In an embodiment the rolled composite aerospace product has a total thickness of at least 0.8 mm.

In an embodiment the rolled composite aerospace product has a total thickness of at most 50.8 mm (2 inches), and preferably of at most 25.4 mm (1 inch), and most preferably of at most 12 mm.

In an embodiment the rolled composite aerospace product is a plate product.

In an embodiment the rolled composite aerospace product is a sheet product.

In an embodiment the 5XXX-series clad layer is from an aluminium alloy having a composition comprising, in wt. %:
  Mg 0.4% to 4.8%, preferably 0.7% to 4.5%;
  Si up to 0.3%, preferably up to 0.25%;
  Fe up to 0.5%, preferably up to 0.40%;
  Sc up to 0.5%;
  Mn up to 1.5%, preferably up to 1%;
  Cu up to 0.2%, preferably up to 0.10%, more preferably up to 0.05%;
  Cr up to 0.25%, preferably up to 0.15%;
  Zr up to 0.25%, preferably up to 0.15%;
  Zn up to 0.5%, preferably up to 0.35%, more preferably up to 0.20%;
  Ti up to 0.2%, preferably up to 0.10%;
  impurities each <0.05%, total <0.15%, and balance aluminium.

In an embodiment of the 5xxx-series clad layer is a high-strength weldable corrosion-resistant Al—Mg—Sc aluminium alloy and it has a composition consisting of, in wt. %:
  Mg 3.0% to 4.8%, preferably 3.5% to 4.5%;
  Sc 0.02% to 0.5%, preferably 0.02% to 0.40%, more preferably 0.1% to 0.3%;
  Mn up to 1%, preferably 0.3% to 1.0%, more preferably 0.3% to 0.8%;
  Zr up to 0.25%, preferably 0.05% to 0.2%, more preferably 0.07% to 0.15%;
  Cr up to 0.3%, preferably up to 0.25%, more preferably 0.02% to 0.2%;
  Ti up to 0.2%, preferably 0.01% to 0.2%;
  Cu up to 0.2%, preferably up to 0.1%, more preferably up to 0.05%;
  Zn up to 0.5%, preferably 0.1% to 0.5%;
  Fe up to 0.5%, preferably up to 0.40%, more preferably up to 0.20%;
  Si up to 0.3%, preferably up to 0.2%, more preferably up to 0.1%;
  impurities and balance aluminium. Typically, such impurities are present each <0.05% and total <0.15%.

In another embodiment of the 5XXX-series clad layer has a composition comprising, in wt. %:
  Mg 0.4% to 3.0%, preferably 0.4% to 2.5%, more preferably 0.7% to 2.5%;
  Si up to 0.3%, preferably up to 0.25%;
  Fe up to 0.5%, preferably up to 0.40%;
  Sc up to 0.04%, preferably up to 0.02%;
  Mn up to 1.5%, preferably up to 1%;
  Cu up to 0.2%, preferably up to 0.10%, more preferably up to 0.05%;
  Cr up to 0.25%, preferably up to 0.15%;
  Zr up to 0.25%, preferably up to 0.15%;
  Zn up to 0.5%, preferably up to 0.35%, more preferably up to 0.20%;
  Ti up to 0.2%, preferably up to 0.10%;
  impurities each <0.05%, total <0.15%, and balance aluminium.

In this embodiment the Mg-content is in a range of about 0.4% to 3.0%, and preferably in a range of about 0.4% to 2.5%, and more preferably of about 0.7% to 2.0%. The Mg provides hardness to the clad layer. However, at too high Mg levels undesired Lueders lines during e.g. a subsequent stretch forming operation may occur.

Mn can be added to the 5XXX-series alloy in a range of up to 1.5%, preferably up to 1% and more preferably up to 0.8%, to increase hardness and strength following solution heat-treatment and rapid cooling. A preferred lower-limit for that purpose is 0.2%, and preferably about 0.30%. Mn will contribute to maintaining a small grain size in the clad layer(s) providing a better surface appearance and less surface cracks after a subsequent forming operation. The presence of Mn increases the anodization quality of the outer-surface of the 5XXX-series layer as it facilitates the beta-AlFeSi phase (Al$_5$FeSi) to alpha-AlFeSi (Al$_8$Fe$_2$Si) transformation and stabilizes the alpha-AlFeSi phases. The presence of Mn will also favourably increase the corrosion potential of the 5XXX-series aluminium alloy and the amount of Mn added can be tuned to reduce and to optimize the corrosion potential difference between the 2XXX-series core alloy and the clad layer(s) depending on the application and thereby enhancing the corrosion resistance of the rolled composite aerospace product.

In another embodiment the Mn-content is up to 0.2%, and preferably up to 0.15%.

In this embodiment of the 5XXX-series layer the Cu-content is in a range of 0.20%, preferably up to 0.10% and more preferably up to 0.05%, for maintaining a good corrosion resistance.

Iron is a common impurity and can be present in a range of up to about 0.5%. If the Fe-content exceeds 0.5%, large Fe containing intermetallics may be formed, and a streak patterns may occur or an anodic oxide layer may become turbid due to the intermetallic compounds. In an embodiment the Fe-content is kept to a maximum of about 0.40%, and preferably of about 0.3%. In an embodiment the Fe-content is at least 0.10%. Al—Mg sheet material processed in accordance with the invention provides very good formability characteristics without having to lower the Fe-content to very low levels (i.e. less than 0.30%, and typically is in a range of 0.15% to 0.30%), although lowering the Fe-content to low levels would further enhance the formability characteristics.

Silicon (Si) is a common impurity also and can be present in a range of up to about 0.3% and preferably is kept to a maximum of about 0.25%. A Si level would be in the range of up to about 0.20%. In an embodiment the Si level is at least about 0.06%, and preferably at least about 0.1% to obtain colour strength and stability after anodization.

Ti is a grain refiner agent during solidification of both ingots and welded joints. Ti levels should not exceed about 0.2%, and the preferred range for Ti is about 0.005% to 0.07%. Ti can be added as a sole element or as is known in the art with either boron or carbon serving as a casting aid for grain size control.

In an embodiment the 5XXX-series clad layer is from an aluminium alloy having a composition consisting of, in wt. %, Mg 0.4% to 3.0%, Si up to 0.3%, Fe up to 0.5%, Sc up to 0.04%, Mn up to 1.5%, Cu up to 0.2%, Cr up to 0.25%, Zr up to 0.25%, Zn up to 0.5%, Ti up to 0.2%, and balance aluminium and impurities, and with preferred narrower compositional ranges as herein described and claimed.

In an embodiment the composition of the 5XXX-series aluminium alloy clad layer is tuned or is set such that it has an open potential corrosion value (vs. Standard Calomel Electrode (SCE), also referred to as "corrosion potential") of −710 mV or less (for example, −780 mV) to provide optimum corrosion protection to the 2XXX-series core alloy, and measured in a solution heat-treated and quenched material in a solution of 53 g/L NaCl plus 3 g/L $H_2O_2$ at 25° C. with a 0.1 N calomel electrode. In a preferred embodiment the corrosion potential of the 5XXX-series aluminium alloy clad layer is in a range of −730 mV to −845 mV, measured after SHT and quenching, thus when the key alloying elements are largely in solid solution.

In an embodiment the corrosion potential difference between the 2XXX core layer and the 5XXX-series aluminium alloy clad layer, i.e. in the final temper, is in a range of 30 to 120 mV, preferably 30 to 100 mV, to provide sufficient corrosion protection from the anodic clad layer to the core layer.

In an embodiment the 2XXX-series core layer is from an aluminium alloy having a composition comprising, in wt. %:
Cu 1.9% to 7.0%, preferably 3.0% to 6.8%, more preferably 3.2% to 4.95%;
Mg 0.30% to 1.8%, preferably 0.35% to 1.8%;
Mn up to 1.2%, preferably 0.2% to 1.2%, more preferably 0.2% to 0.9%;
Si up to 0.40%, preferably up to 0.25%;
Fe up to 0.40%, preferably up to 0.25%;
Cr up to 0.35%, preferably up to 0.10%;
Zn up to 1.0%;
Ti up to 0.15%, preferably 0.01% to 0.10%;
Zr up to 0.25, preferably up to 0.12%;
V up to 0.25%;
Li up to 2.0%;
Ag up to 0.80%;
Ni up to 2.5%;
balance being aluminium and impurities. Typically, such impurities are present each <0.05%, total <0.15%.

In another embodiment the 2XXX-series core layer is from an aluminium alloy having a composition comprising, in wt. %:
Cu 1.9% to 7.0%, preferably 3.0% to 6.8%, more preferably 3.2% to 4.95%;
Mg 0.30% to 1.8%, preferably 0.8% to 1.8%;
Mn up to 1.2%, preferably 0.2% to 1.2%, more preferably 0.2 to 0.9%;
Si up to 0.40%, preferably up to 0.25%;
Fe up to 0.40%, preferably up to 0.25%;
Cr up to 0.35%, preferably up to 0.10%;
Zn up to 0.4%;
Ti up to 0.15%, preferably 0.01% to 0.10%;
Zr up to 0.25, preferably up to 0.12%;
V up to 0.25%;
balance being aluminium and impurities. Typically, such impurities are present each <0.05%, total <0.15%.

In preferred embodiment the 2XXX-series core layer is from an AA2X24-series aluminium alloy, wherein X is equal to 0, 1, 2, 3, 4, 5, 6, 7, or 8. A particular preferred aluminium alloy is within the range of AA2024, AA2524, and AA2624.

In an embodiment the 2XXX-series core layer is provided in a T3, T351, T39, T42, T8 or T851 condition.

The 2XXX-series core layer can be provided to a user in a non-solution heat treated condition, such as an "F" temper or an annealed "O" temper, and then formed and solution heat treated and aged to the required condition, e.g. a T3, T351, T39, T42, T8 or T851 temper.

The invention relates also to a method of manufacturing the rolled composite aerospace product of this invention, the method comprising the steps of:
providing an ingot or rolling feedstock of a 2XXX-series aluminium alloy for forming the core layer of the composite aerospace product;
homogenizing the ingot of said 2XXX-series aluminium alloy at a temperature in the range of 400° C. to 505° C. for at least 2 hours;
providing an ingot or rolled clad liner of a 5XXX-series aluminium alloy for forming an outer clad layer on the 2XXX-series core aluminium alloy; optionally two ingots or two rolled clad liners of the 5XXX-series aluminium alloy are provided for forming a clad layer on each side of the 2XXX-series core aluminium alloy;
optionally homogenizing or preheating the ingot(s) of the 5XXX-series aluminium alloy at a temperature in the range of at least 470° C. for at least 0.5 hour, and preferably at a temperature in a range of 480° C. to 570° C.;
roll bonding of the 5XXX-series aluminium alloy layer(s) to the 2XXX-series core alloy layer to form a roll bonded product, preferably by means of hot rolling and optionally followed by cold rolling;
solution heat-treating the roll bonded product at a temperature in the range of 450° C. to 505° C., either in a batch operation or a continuous operation;
cooling of the solution heat-treated roll bonded product to below 100° C., and preferably to ambient temperature;
optionally stretching of the solution heat-treated roll bonded product, preferably by means of cold stretching in a range of 0.5% to 8% of its original length, preferably in a range of 0.5% to 6%, more preferably of 0.5% to 4%, and most preferably of 0.5% to 3%; and
ageing of the cooled roll bonded product, by natural ageing and/or artificial ageing. In a preferred embodiment the ageing brings to 2XXX-series core layer to a T3, T351, T39, T42, T8 or T851 temper. The 5XXX-series alloy clad layers will be in an annealed condition. The 5XXX-series alloy clad layers having less than 2.5% Mg will be in an O-temper.

In an embodiment of the method according to the invention, in a next processing steps the rolled composite aerospace product is formed in a forming process, at ambient temperature or at elevated temperature, into a shaped product having at least one of a uniaxial curvature or a biaxial curvature.

In an alternative embodiment of the method, after roll bonding of the 5XXX-series aluminium alloy(s) to the 2XXX-series core alloy to form a roll bonded product, preferably by means of hot rolling and optionally followed by cold rolling, the roll bonded product is formed in a forming process, at ambient temperature or at elevated temperature, into a shaped product having at least one of a uniaxial curvature or a biaxial curvature, followed by a solution heat-treatment and subsequent ageing to a final temper.

The forming can be by a forming operation from the group of a bending operation, roll forming, stretch forming, age creep forming, deep drawing, and high-energy hydroforming, in particular by explosive forming or electrohydraulic forming.

In an embodiment the forming operation at elevated temperature is performed at a temperature in a range of 140° C. to 200° C., and preferably the aerospace product is kept at the forming temperature for a time in a range of 1 to 50 hours. In a preferred embodiment the forming at elevated temperature is by means of an age creep forming operation. Age creep forming is a process or operation of restraining a component to a specific shape during ageing heat treatment, allowing the component to relieve stresses and creep to contour, for example fuselage shells with a single or double curvature.

In an embodiment it is excluded from the current invention that the rolled composite aerospace product according to this invention after having received a solutioning heat treatment (SHT) and prior to forming into a predetermined shape receives a post-SHT cold working step inducing at least 25% cold work in the rolled composite aerospace product, in particular the cold working comprises cold rolling of the rolled aerospace product to final gauge, as disclosed in patent document US-2014/036699-A1 and incorporated herein by reference.

In an aspect of the invention it relates to the use of the 5XXX-series aluminium alloy as herein described and claimed as a clad layer on one or both surface of a 2XXX-series aluminium alloy to form a rolled aerospace clad product.

In a further aspect of the invention there is provided a welded structure comprising of a rolled composite aerospace product according to this invention and at least one aluminium alloy stiffening element joined to the rolled composite aerospace product by means of riveting or a welding operation.

In an embodiment the invention relates to a welded structural member of an aircraft comprising of a rolled composite aerospace product according to this invention and at least one aluminium alloy stiffening element, preferably a stringer, joined to the rolled composite aerospace product by means of a riveting or a welding operation, for example by means of laser beam welding or by friction stir welding.

It also relates to welded fuselage structures whereby the fuselage panels are joined to each other by means of laser beam welding ("LBW") or friction stir welding ("FSW"), e.g. by means of butt welds.

The invention also comprises an aircraft or spacecraft, the fuselage of which is wholly or partially constructed out of the rolled composite aerospace product according to this invention, which may be incorporated into various structural portions of the aircraft. For example, the various disclosed embodiments may be used to form structural portions in the wing assemblies and/or structural portions in the tail assembly (empennage). The aircraft is generally representative of commercial passenger or freight aircraft. In alternative embodiments, the present invention may also be incorporated into flight vehicles of other types. Examples of such flight vehicles included manned or unmanned military aircraft, rotary wing aircraft, or even ballistic flight vehicles.

The invention rolled composite aerospace product can be shaped into a member for an airplane, such as a fuselage component or panel, or as a wing component or panel, and the airplane can utilize the advantage of the invention as described. The shaping referred to can include bending, stretch forming, machining and other shaping operations known in the art for shaping panels or other members for aircraft, aerospace or other vehicles. Forming involving bending or other plastic deformation can be performed at room temperature or at elevated temperatures.

DESCRIPTION OF THE DRAWINGS

The invention shall also be described with reference to the appended drawings, in which:

FIG. 1 illustrates the embodiment of a rolled composite aerospace product 10 consisting of a three-layered structure of a 2XXX-series core alloy layer 20 having on each side an Al—Mg alloy clad layer 30 of a 5XXX-series aluminium alloy as herein set forth and claimed. Not shown here, but in another embodiment the 2XXX-series core alloy is clad only on one side or face with a 5XXX-series alloy clad liner.

FIG. 2 illustrates the embodiment of a rolled composite aerospace product 10 having a five-layered structure consisting of a 2XXX-series core alloy layer 20 having on each side a 5XXX-series aluminium alloy clad layer 30 as herein set forth and claimed, and wherein another and different aluminium alloy interliner or clad layer 40 is interposed between the core alloy layer 20 and the 5XXX-series alloy clad layer 30 such that the 5XXX-series alloy clad layer 30 forms the outer layer of the rolled composite aerospace product 10. The interliner or clad layer 40 is also made of an aluminium alloy having a lower Mg-content than the 5XXX-series alloy clad layer 30.

FIG. 3 is a schematic flow schedule of several embodiments of the process of this invention to manufacture a rolled composite aerospace product. In process step 1 an ingot is cast of a 2XXX-series alloy forming the core alloy of the composite aerospace product, which optionally can be scalped in step 2 to remove segregation zones near the as-cast surface of the rolling ingot and to increase product flatness. In process step 3 the rolling ingot is homogenized. In parallel in process step 4 an ingot is cast of a 5XXX-series alloy for forming at least one clad layer on a surface of the core alloy of the composite aerospace product, and optionally on both faces of the core alloy. Also this ingot optionally can be scalped in step 5. In process step 6 the 5XXX-series alloy is pre-heated to the hot rolling start temperature and subsequently in process step 7 hot rolled to form liner plate(s) as the clad layer is usually much thinner than the core. In process step 8 the 2XXX core alloy and a 5XXX-series alloy liner plate on one or both sides of the core alloy are roll bonded, preferably by means of hot rolling. Depending on the desired final gauge, the roll bonded product can be cold rolled in process step 9 to final gauge, for example to a sheet product or a thin gauge plate product. In a process step 10 the rolled aerospace product is solution heat treated, next cooled in process step 11, and preferably stretched in process step 12.

Figure 1:
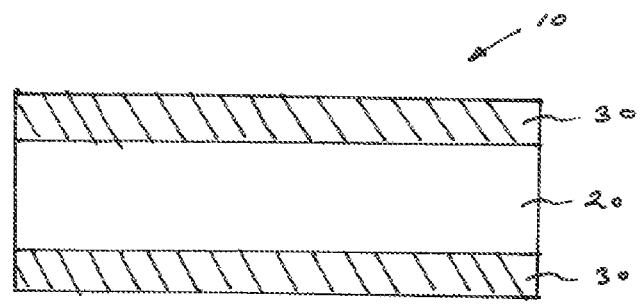
FIG. 1 is a schematic diagram of a rolled composite aerospace product according to an embodiment of the invention.
Figure 2:
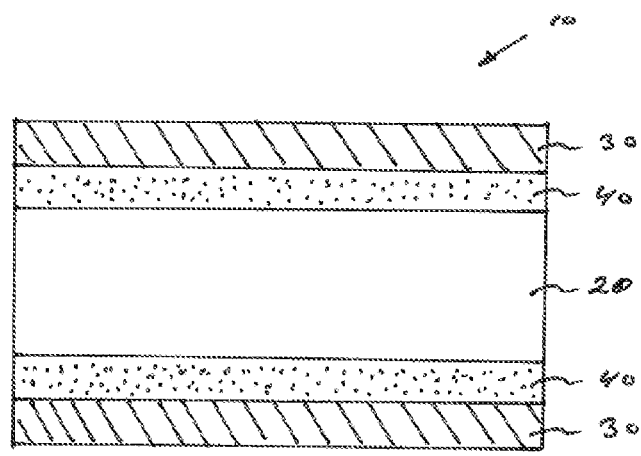
FIG. 2 is a schematic diagram of a rolled composite aerospace product having five distinct layers in accordance with certain illustrative embodiments of the invention.
Figure 3:
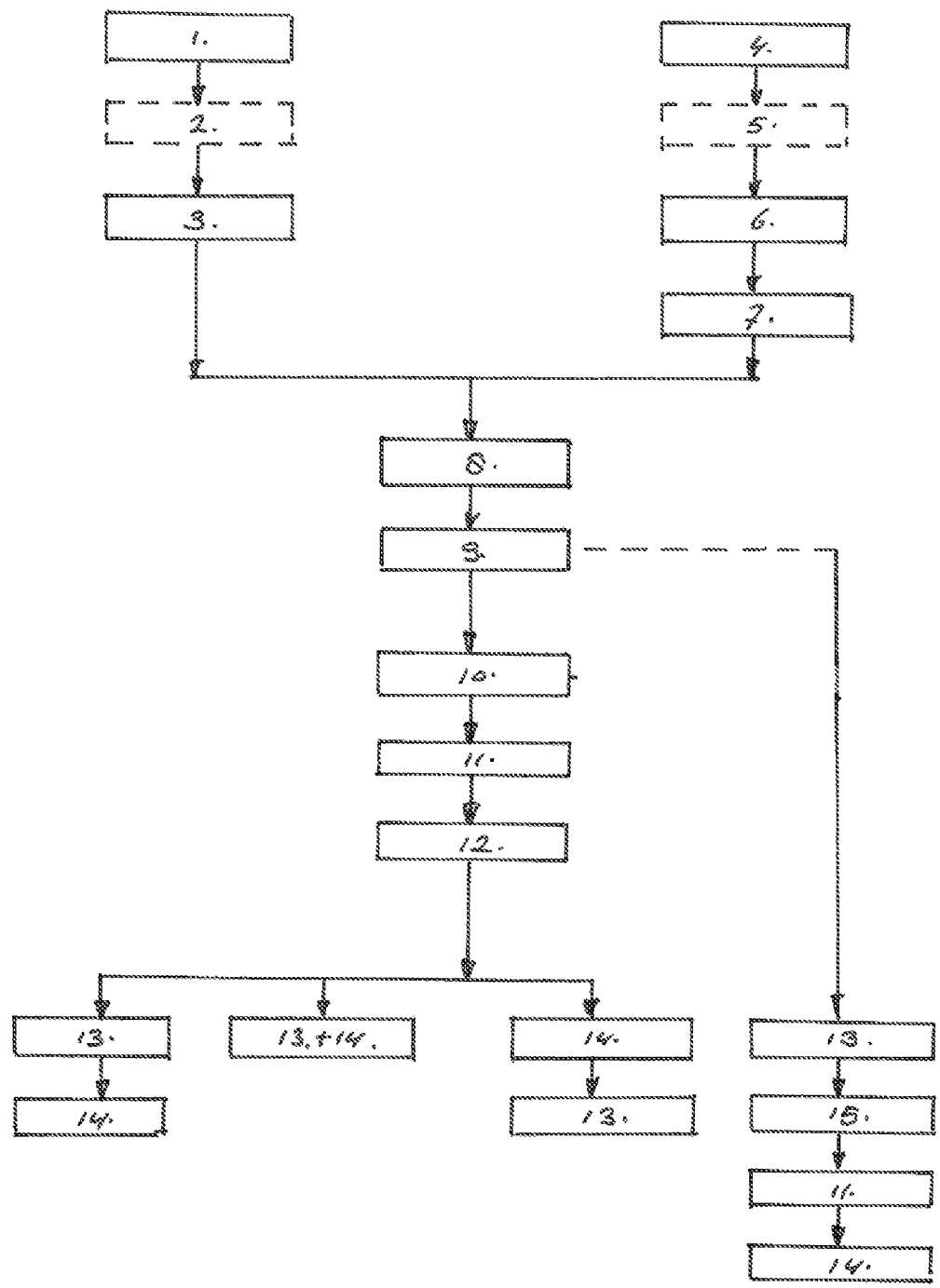
FIG. 3 is a schematic flow schedule of several embodiments of the process to manufacture a rolled composite aerospace product according to this invention.

In an embodiment the cooled product is formed in forming process 13 and ageing, i.e. natural or artificial ageing, in process step 14 to final temper, e.g. a T3 or T8 temper.

In an embodiment the forming process 13 and the ageing of process step 14 can be combined, for example the forming operation is performed at a temperature in a range of 140° C. to 200° C., and preferably for a time in a range of 1 to 50 hours, such that also artificial ageing of both the 2XXX-series core and the 5XXX-series clad layer(s) occurs.

In an embodiment the cooled product is aged in process step 14, i.e. natural or artificial ageing, to a desired temper, and subsequently formed in a forming process 13 into a formed product of predetermined shape.

In an alternative embodiment after rolling bonding of the 2XXX-series core and the 5XXX-series clad layer(s) to final gauge, the rolled product is formed in a forming process 13 into a predetermined shape, solution heat treated of the formed product in process step 15 and cooled in process step 11 and followed by ageing, i.e. natural or artificial ageing, in process step 14 to final temper, e.g. a T3 or T8 temper.

The invention is not limited to the embodiments described before, and which may be varied widely within the scope of the invention as defined by the appending claims.

The invention claimed is:

1. A rolled composite aerospace product comprising a 2XXX-series core layer and an Al—Mg alloy clad layer coupled to at least one surface of the 2XXX-series core layer, wherein the Al—Mg alloy is a 5XXX-series aluminium alloy comprising 0.4% to 4.8% Mg, wherein the 2XXX-series alloy of the 2XXX-series core layer has a composition comprising, in wt. %,
Cu 1.9% to 7.0%,
Mg 0.30% to 1.8%,
Mn up to 1.2%,
Si up to 0.40%,
Fe up to 0.40%,
Cr up to 0.35%,
Zn up to 1.0%,
Ti up to 0.15%,
Zr up to 0.25%,
V up to 0.25%,
Li up to 2.0%,
Ag up to 0.80%,
Ni up to 2.5%,
balance being aluminium and impurities.

2. The rolled composite aerospace product according to claim 1, wherein the Al—Mg alloy is a 5XXX-series aluminium alloy having a composition of, in wt. %:
Mg 0.4% to 4.8%
Si up to 0.3%,
Fe up to 0.5%,
Sc up to 0.5%,
Mn up to 1.5%,
Cu up to 0.2%,
Cr up to 0.25%,
Zr up to 0.25%,
Zn up to 0.5%,
Ti up to 0.2%,
impurities each <0.05%, total <0.15%, and balance aluminium.

3. The rolled composite aerospace product according to claim 1, wherein the Al—Mg alloy is a 5XXX-series aluminium alloy comprising, in wt. %:
Mg 0.4% to 3.0%,
Si up to 0.3%,
Fe up to 0.5%,
Sc up to 0.04%,
Mn up to 1.5%,
Cu up to 0.2%,
Cr up to 0.25%,
Zr up to 0.25%,
Zn up to 0.5%,
Ti up to 0.2%,
impurities each <0.05%, total <0.15%, and balance aluminium.

4. The rolled composite aerospace product according to claim 1, wherein the Al—Mg alloy is a 5XXX-series aluminium alloy comprising, in wt. %:
Mg 3.0% to 4.8%,
Sc 0.02% to 0.5%,
Mn up to 1%,
Zr up to 0.25%,
Cr up to 0.3%,
Ti up to 0.2%,
Cu up to 0.25%,
Zn up to 0.5%,
Fe up to 0.5%,
Si up to 0.3%,
impurities each <0.05%, total <0.15%, and balance aluminium.

5. The rolled composite aerospace product according to claim 1, wherein the Al—Mg alloy clad layer is coupled by means of roll bonding to the at least one surface of the 2XXX-series core layer.

6. The rolled composite aerospace product according to claim 1, wherein the Al—Mg alloy clad layer has a thickness in the range of 1% to 20% of the total thickness of the rolled composite aerospace product.

7. The rolled composite aerospace product according to claim 1, consisting of a 2XXX-series core layer and an Al—Mg alloy clad layer coupled to one surface of the 2XXX-series core layer.

8. The rolled composite aerospace product according to claim 1, consisting of a 2XXX-series core layer and an Al—Mg alloy clad layer coupled to both surfaces of the 2XXX-series core layer.

9. The rolled composite aerospace product according to claim 1, wherein an interliner is positioned between the 2XXX-series core layer and the Al—Mg alloy layer, and wherein the interliner is made from a different aluminium alloy than the Al—Mg alloy layer and has a Mg-content lower than the Al—Mg alloy.

10. The rolled composite aerospace product according to claim 1, wherein the 2XXX-series core layer (20) is from the 2x24-series alloy.

11. The rolled composite aerospace product according to claim 1, wherein the 2XXX-series core layer (20) is in a T3, T351, T39, T42, T8 or T851 temper.

12. The rolled composite aerospace product according to claim 1, wherein the rolled composite aerospace product (10) has a total thickness of 0.8 mm to 50.8 mm.

13. The rolled composite aerospace product according to claim 1, wherein the rolled composite aerospace product is an aerospace structural part.

14. A rolled composite aerospace product comprising a 2XXX-series core layer and an Al—Mg alloy clad layer coupled to at least one surface of the 2XXX-series core layer, wherein the Al—Mg alloy is a 5XXX-series aluminium alloy comprising 0.4% to 4.8% Mg, wherein the rolled composite aerospace product is an aerospace structural part.

* * * * *